United States Patent
Kang et al.

(10) Patent No.: US 9,052,453 B2
(45) Date of Patent: Jun. 9, 2015

(54) DISPLAY SUBSTRATE, METHOD OF MANUFACTURING THE SAME, AND DISPLAY PANEL HAVING THE SAME

(75) Inventors: Hoon Kang, Suwon-si (KR); Jae-Sung Kim, Suwon-si (KR); Jin-Young Choi, Incheon (KR); YoungJe Cho, Asan-si (KR); Woo-Seok Jeon, Seoul (KR)

(73) Assignee: SAMSUNG DISPLAY CO., LTD. (KR)

( * ) Notice: Subject to any disclaimer, the term of this patent is extended or adjusted under 35 U.S.C. 154(b) by 72 days.

(21) Appl. No.: 13/185,276

(22) Filed: Jul. 18, 2011

(65) Prior Publication Data
US 2012/0154722 A1    Jun. 21, 2012

(30) Foreign Application Priority Data
Dec. 21, 2010 (KR) .................. 10-2010-0131735

(51) Int. Cl.
G02F 1/1333 (2006.01)
G02B 5/20 (2006.01)
G02B 5/00 (2006.01)
G02F 1/1335 (2006.01)

(52) U.S. Cl.
CPC ............... *G02B 5/201* (2013.01); *G02B 5/003* (2013.01); *G02F 1/133512* (2013.01); *G02F 1/133514* (2013.01)

(58) Field of Classification Search
CPC ................................. G02F 1/133516
USPC .................................. 349/110, 106
See application file for complete search history.

(56) References Cited

U.S. PATENT DOCUMENTS

| | | | |
|---|---|---|---|
| 5,689,318 A * | 11/1997 | Matsuyama et al. | 349/106 |
| 6,330,043 B1 * | 12/2001 | Kikkawa et al. | 349/43 |
| 6,392,728 B2 * | 5/2002 | Tanaka et al. | 349/106 |
| 7,470,621 B2 | 12/2008 | Endo et al. | |
| 2007/0059612 A1* | 3/2007 | Yoshioka et al. | 430/7 |
| 2007/0196568 A1* | 8/2007 | Kim et al. | 427/162 |
| 2009/0008731 A1 | 1/2009 | Kim | |

FOREIGN PATENT DOCUMENTS

| | | |
|---|---|---|
| JP | 2002-148429 A | 5/2002 |
| JP | 2002-372613 A | 12/2002 |
| JP | 2003-161826 A | 6/2003 |
| JP | 2006-284674 A | 10/2006 |
| JP | 2007-206686 A | 8/2007 |
| JP | 2009-145800 A | 7/2009 |
| JP | 2009-282096 A | 12/2009 |
| JP | 2010-197560 A | 9/2010 |
| KR | 1020090087707 A | 8/2009 |

\* cited by examiner

*Primary Examiner* — Richard Kim
*Assistant Examiner* — Kendrick Hsu
(74) *Attorney, Agent, or Firm* — Innovation Counsel LLP

(57) ABSTRACT

A display panel includes a base substrate having a plurality of pixel areas, in which each pixel area includes a plurality of sub-pixel areas, a light blocking layer pattern generally defining the sub-pixel areas, and a plurality of color filter patterns. Upper surfaces of the light blocking layer pattern and the plurality of color filter patterns collectively form a generally flat surface.

3 Claims, 4 Drawing Sheets

DISPLAY SUBSTRATE, METHOD OF MANUFACTURING THE SAME, AND DISPLAY PANEL HAVING THE SAME

CROSS-REFERENCE TO RELATED APPLICATION

This application relies for priority upon Korean Patent Application No. 10-2010-0131735 filed on Dec. 21, 2010, the contents of which are herein incorporated by reference in their entirety.

BACKGROUND

1. Field of Disclosure

Embodiments of the present invention relate generally to flat panel displays. More particularly, embodiments of the present invention relate to a display substrate having a reduced step difference on an exposed surface thereof, a method of manufacturing the display substrate, and a display panel having the display substrate.

2. Description of the Related Art

A display panel of a flat-panel display substrate typically includes a plurality of pixels to display colors. A pixel area is generally defined by a light blocking layer, and a plurality of color filters is provided in the pixel area.

Recently, as pixel sizes have shrunk, increasing use has been made of a photosensitive organic material that is applied to the light blocking layer and the color filters by a photolithography process.

However, the photolithography process typically requires coating, exposure, development and curing processes, lengthening the manufacturing time for the display substrate, as well as its cost.

In addition, if the organic material is applied to the color filters and the light blocking layer, a step difference in elevation may occur at the boundary region between the color filter and the light blocking layer, so an additional process is necessary to form an overcoat layer.

SUMMARY

Exemplary embodiments of the present invention provide a display substrate which is flatter or more planar, having a reduced step difference in elevations of an exposed surface thereof Exemplary embodiments of the present invention also provide a method of manufacturing such a display substrate.

Exemplary embodiments of the present invention further provide a display panel having such a display substrate.

According to exemplary embodiments, a display substrate includes a base substrate having a plurality of pixel areas, each pixel area including a plurality of sub-pixel areas, a light blocking layer pattern disposed between adjacent sub-pixel areas, and a plurality of color filter patterns corresponding to the sub-pixel areas.

Upper surfaces of the light blocking layer pattern and the plurality of color filter patterns may collectively form a generally flat surface.

At least one of the color filter patterns and the light blocking layer pattern may include a reverse-tapered edge portion, and an edge portion of a pattern adjacent to the pattern having the reverse-tapered edge portion may be tapered so as to overlap the reverse-tapered edge portion at a lower portion of the reverse-tapered edge portion.

The light blocking layer pattern may have a thickness substantially equal to or less than a thickness of the color filter patterns. The thickness of the light blocking layer pattern can be substantially equal to the thickness of the color filter patterns, so a surface of the base substrate where the color filter patterns and the light blocking layer pattern are exposed is substantially planar.

A height of the color filter patterns may be substantially equal to or greater than a height of the light blocking layer pattern, and a height of a point of intersection between an upper surface of the light blocking layer pattern and the edge portions of the color filter patterns may be greater than a height of other portions of the upper surface of the light blocking layer pattern.

An edge portion of the light blocking layer pattern may be tapered, and an edge portion of one of the color filter patterns disposed between the light blocking layer patterns may be reverse-tapered while overlapping the edge portion of the light blocking layer pattern.

A height of the light blocking layer pattern may be substantially equal to or greater than a height of the one of the color filter patterns, and a height of a point of intersection between an upper surface of the color filter pattern and the edge portion of the light blocking layer pattern may be greater than a height of other portions of the upper surface of the color filter pattern.

The one of the color filter patterns may have a lowest height at a center of its upper surface.

According to exemplary embodiments, a method of manufacturing the display substrate is provided. According to the method, a base substrate having a plurality of pixel areas, each including a plurality of sub-pixel areas, is received, the base substrate further having first areas including the plurality of sub-pixel areas, second areas between adjacent ones of the sub-pixel areas, and third areas outside the first and second areas. A photosensitive organic material pattern is formed on the third areas but not on the first and second areas. Then, a non-photosensitive organic material pattern is formed outside the third areas, so that upper surfaces of the photosensitive and non-photosensitive organic material patterns collectively form a generally flat surface.

An edge portion of the photosensitive organic material pattern adjacent to the non-photosensitive organic material pattern may be tapered.

The non-photosensitive organic material pattern may be formed by coating a non-photosensitive organic material on an entire surface of the base substrate formed with the photosensitive organic material pattern, developing the non-photosensitive organic material to pattern the non-photosensitive organic material such that the non-photosensitive organic material remains only in a region between the photosensitive organic material patterns, and curing the developed non-photosensitive organic material.

According to the exemplary embodiments, a display panel includes an array substrate, an opposite substrate facing the array substrate, and a liquid crystal layer interposed between the array substrate and the opposite substrate.

One of the array substrate and the opposite substrate may include a base substrate having a plurality of pixel areas, each pixel area including a plurality of sub-pixel areas, a light blocking layer pattern generally defining the sub-pixel areas, and a plurality of color filter patterns corresponding to the sub-pixel areas. Upper surfaces of the light blocking layer pattern and the plurality of color filter patterns may collectively form a generally flat surface.

At least one of the color filter patterns and the light blocking layer pattern may include a reverse-tapered edge portion, and an edge portion of a pattern adjacent to the pattern having the reverse-tapered edge portion may be tapered so as to overlap the reverse-tapered edge portion at a lower portion of the reverse-tapered edge portion.

As described above, the edge portion of the color filter overlaps with the tapered edge portion of the light blocking layer, so that step differences in height between the two may be reduced and the display substrate may have a substantially flat surface even if an overcoat layer is not provided.

In addition, the display substrate can be manufactured without performing an exposure process, so that the manufacturing process can be simplified.

BRIEF DESCRIPTION OF THE DRAWINGS

The above and other advantages of the present invention will become readily apparent by reference to the following detailed description when considered in conjunction with the accompanying drawings wherein.

DETAILED DESCRIPTION

Figure 1:
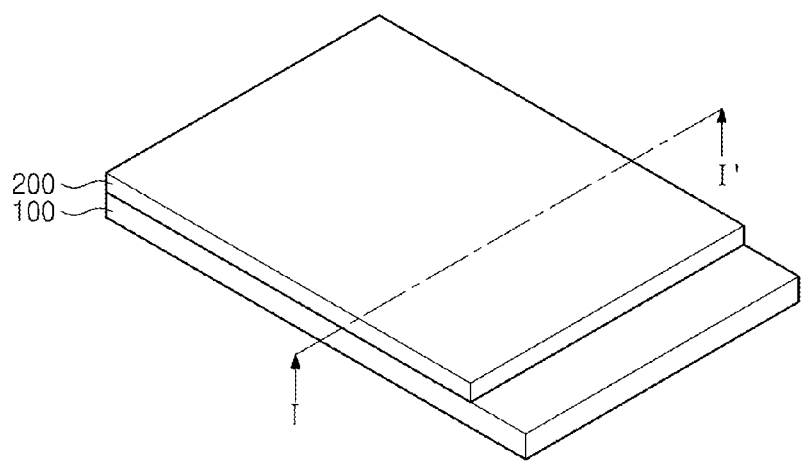
FIG. 1 is a perspective view showing a display panel according to one embodiment of the present invention.

The present invention can be modified in various forms and may not be limited to the following embodiments but include various applications and modifications. The following embodiments are provided to clarify the technical spirit disclosed in the present invention and to sufficiently transmit the technical spirit of the present invention to the one having mean knowledge and skill in this field. Therefore, the scope of the present invention should not be limited to the following embodiments.

When describing each attached drawing, similar reference numerals are designated as similar components. In addition, the size of the layers and regions of the attached drawings along with the following embodiments are simplified or exaggerated for precise explanation or emphasis and the same reference numeral represents the same component. The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention. Similarly, the second component may be named as the first component. The expression of the singular number in the specification includes the meaning of the plural number unless the meaning of the singular number is definitely different from that of the plural number in the context.

In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

Hereinafter, exemplary embodiments of the present invention will be described in detail with reference to accompanying drawings.

Figure 2:
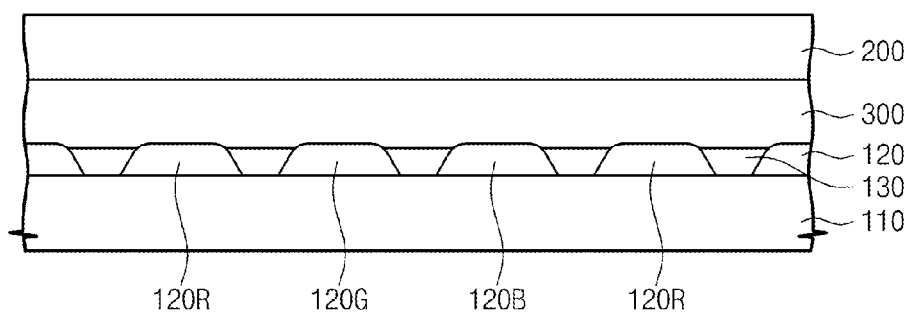
FIG. 2 is a sectional view taken along line I-I' of FIG. 1.

FIG. 1 is a perspective view showing a display panel according to one embodiment of the present invention, and FIG. 2 is a sectional view taken along line I-I' of FIG. 1.

Referring to FIGS. 1 and 2, a display panel according to one embodiment of the present invention displays an image and can be one of various types of display panels, such as a liquid crystal display (LCD) panel and an electrophoretic display panel. In the present embodiment, the display panel is an LCD panel.

The display panel has a rectangular plate shape having long lateral sides and opposing short lateral sides. In addition, the display panel includes an array substrate 100, an opposite substrate 200 and a liquid crystal layer 300 interposed therebetween.

According to one embodiment of the present invention, the array substrate 100 may include a plurality of pixels (not shown) formed on a base substrate 110 generally in the form of a matrix. Each pixel includes a gate line (not shown) extending generally in a first direction parallel to one edge of the array substrate 100, a data line (not shown) extending generally in a second direction perpendicular to the first direction while crossing the gate line, and a pixel electrode (not shown). In addition, each pixel includes a thin film transistor (not shown) electrically connected to the gate line, and to the data line in correspondence with the pixel electrode. The thin film transistor switches a driving signal supplied to the pixel electrode. In addition, a driver IC (not shown) can be provided at one side of the array substrate 100. The driver IC receives various external signals, and outputs driving signals in response to the external signals so as to drive the display panel.

The opposite substrate 200 may include a common electrode (not shown) facing the pixel electrode.

The liquid crystal layer 300 is aligned in a specific direction according to the voltage applied to the pixel electrode and the common electrode, to thereby adjust the transmittance of light supplied from a backlight unit (not shown), so that an image is displayed on the display panel.

Meanwhile, the pixel includes a plurality of sub-pixel areas to allow the display panel to display images having various colors. A plurality of color filter patterns 120 is provided in the sub-pixel areas in one-to-one correspondence. Each pixel may include at least a red color filter pattern 120R, a green color filter pattern 120G, and a blue color filter pattern 120B, although any combination and number of colors is contemplated. For example, each pixel may further include a yellow color filter pattern (not shown).

A light blocking layer pattern 130 is provided between two adjacent color filter patterns 120 to block light. That is, the light blocking layer pattern 130 is disposed between adjacent sub-pixel areas.

Although it has been described that the color filter patterns 120 and the light blocking layer pattern 130 are aligned on the array substrate 100, the present invention is not limited thereto. For instance, the color filter patterns 120 and the light blocking layer pattern 130 can be formed on the opposite substrate 200 instead.

Figure 3:
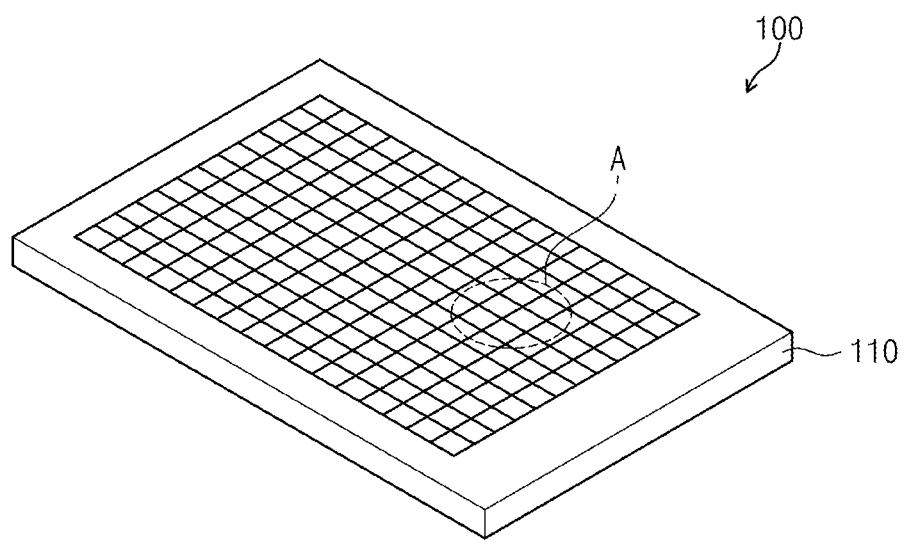
FIG. 3 is a perspective view showing a display substrate used in a display panel according to one embodiment of the present invention.
Figure 4:
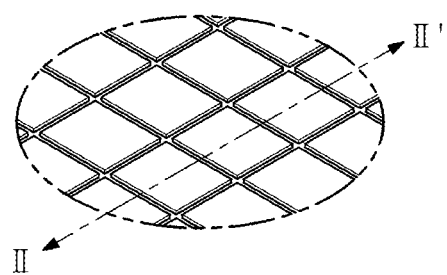
FIG. 4 is an enlarged view of an "A" portion of FIG. 3.
Figure 5:
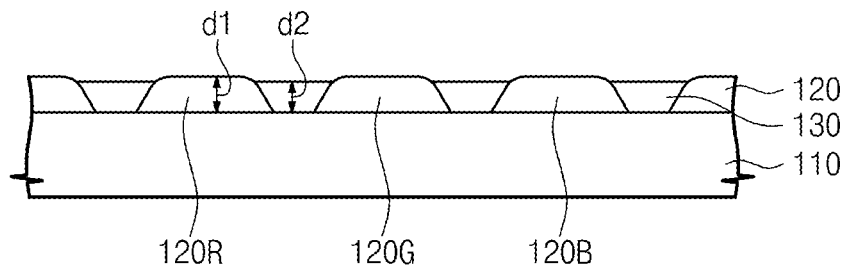
FIG. 5 is a sectional view taken along line II-II' of FIG. 4.

FIG. 3 is a perspective view showing a display substrate used in the display panel according to one embodiment of the present invention, FIG. 4 is an enlarged view of portion "A" of FIG. 3, and FIG. 5 is a sectional view taken along line II-II' of FIG. 4.

Referring to FIGS. 3 to 5, one of the array substrate 100 and the opposite substrate 200 can be used as the display substrate (i.e., can include a plurality of pixels). In the embodiment(s) shown, the array substrate 100 is used as the display substrate.

The display substrate used in the display panel includes the base substrate 110, the color filter patterns 120 formed on the base substrate 110, and the light blocking layer pattern 130.

The base substrate 110 includes a plurality of pixels, and each pixel has a plurality of sub-pixel areas. The base substrate 110 may be one of the array substrate 100 and the opposite substrate 200.

If the array substrate 100 is used as the base substrate 110, a plurality of pixels (not shown) is formed on the array substrate 100 in the form of a matrix. In addition, the pixel electrode (not shown) may be formed in each pixel.

If the opposite substrate 200 is instead used as the base substrate 110, a plurality of pixel areas may be defined on the opposite substrate 200 by the light blocking layer pattern 130. In this case, the array substrate 100 may include the common electrode (not shown) facing the pixel electrode.

The color filter patterns 120 may include at least the red color filter pattern 120R, the green color filter pattern 120G, and the blue color filter pattern 120B, which are formed to correspond to the sub-pixel areas in on-to-one correspondence to form one pixel. In addition, each pixel may further include a yellow color filter pattern (not shown).

The light blocking layer pattern 130 is provided between two adjacent color filter patterns 120. In addition, the light blocking layer pattern 130 blocks external or ambient light, so as to improve the contrast of the display panel and the display apparatus.

One of the color filter patterns 120 and the light blocking layer pattern 130 may have a reverse-tapered edge portion and the other patterns may have a tapered edge portion. The edge of the patterns having tapered edge portion form an acute included angle with the underlying substrate, and the patterns decreases in width with increasing distance from the substrate. The edge of the pattern having reverse-tapered edge portion form an acute included angle with the underlying substrate, and the pattern increases in width with increasing distance from the substrate. It can be seen that the edge of the pattern with reverse-tapered edge overlaps the edge of the patterns with tapered edge, and will themselves be reverse-tapered rather than tapered.

In detail, the red color filter pattern 120R, the green color filter pattern 120G, and the blue color filter pattern 120B are aligned on the sub-pixel areas in on-to-one correspondence, and each color filter pattern 120 has a tapered edge portion, i.e. tapered sides, so that its width generally decreases with increasing distance from the substrate.

The light blocking layer pattern 130 is provided between two adjacent color filter patterns 120 and an edge portion of the light blocking layer pattern 130 is reverse-tapered while overlapping with the edge portions of the color filter patterns 120, i.e. the light blocking layer pattern 130 has reverse-tapered sides.

In addition, a thickness d2 of the light blocking layer pattern 130 is substantially equal to or smaller than a thickness d1 of the color filter patterns 120. Preferably, the thickness d2 of the light blocking layer pattern 130 is substantially equal to the thickness d1 of the color filter patterns 120.

The edge portion of the light blocking layer pattern 130 may only overlap with the tapered edge portions of the color filter patterns 120, not the remainder of the patterns 120.

Thus, the display substrate according to the present invention can minimize the step differences in elevation between the color filter patterns 120 and the light blocking layer pattern 130.

In particular, if the thickness d2 of the light blocking layer pattern 130 is equal to the thickness d1 of the color filter patterns 120, the upper surfaces of the color filter patterns 120 and the light blocking layer pattern 130 may collectively form a flattened surface (i.e., a surface that is almost, or substantially, flat or planar). Thus, an overcoat layer used to flatten or planarize the surface of the display substrate may not be necessary.

Otherwise, the step difference may occur at the edge portion of the color filter and the upper surface of the display substrate may have a relatively high roughness. Thus, an additional process is often desired, in order to flatten or planarize the upper surface of the display substrate.

Figure 6:
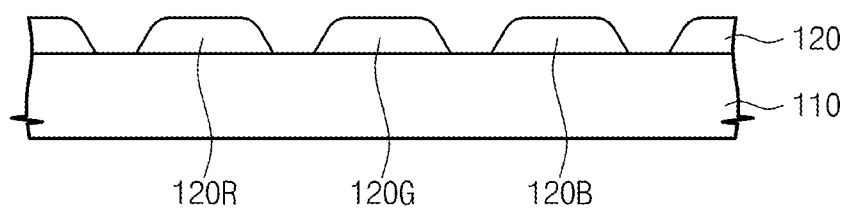
FIGS. 6 to 8 are sectional views showing the procedure to manufacture a display substrate used in a display panel according to one embodiment of the present invention.
Figure 7:
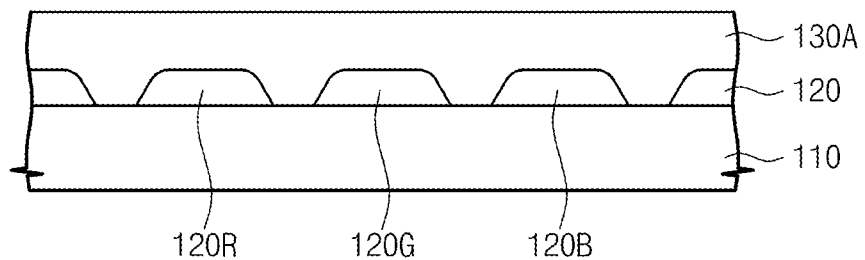
Figure 8:
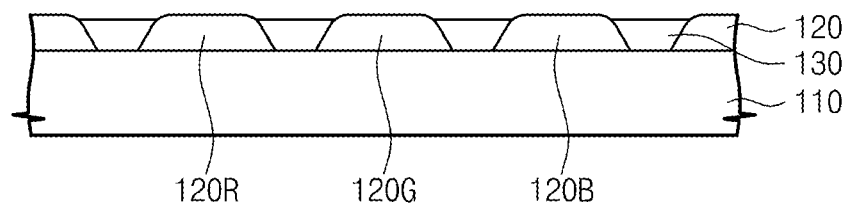

FIGS. 6 to 8 are sectional views showing a process for manufacturing the display substrate used in the above-described display panel.

Referring to FIG. 6, the base substrate 110 is first prepared. As above, the base substrate 110 has had a plurality of pixels fabricated thereon, and each pixel includes a plurality of sub-pixel areas. In addition, the base substrate 110 may include a glass substrate or a plastic substrate.

If the array substrate 100 is used as the display substrate, the base substrate 110 may include a plurality of pixels (not shown) laid out in a matrix pattern, a gate line (not shown), a data line (not shown), a pixel electrode (not shown) and a thin film transistor (not shown).

Alternatively, if the opposite substrate 200 is used as the display substrate, the base substrate 110 may instead include a common electrode (not shown) facing the pixel electrode of the array substrate 100.

After preparing the base substrate 110, a photosensitive organic material pattern is formed on one surface of the base substrate 110. The photosensitive organic material pattern may be formed as a plurality of color filter patterns 120. The color filter patterns 120 may include at least a red color filter pattern 120R, a green color filter pattern 120G, and a blue color filter pattern 120B. In addition, the color filter patterns 120 may further include a yellow color filter pattern (not shown).

According to the present embodiment, the color filter patterns 120 include the red color filter pattern 120R, the green color filter pattern 120G, and the blue color filter pattern 120B, which are used as the photosensitive organic material pattern.

In detail, a photosensitive organic material is coated on the base substrate 110. The photosensitive organic material may include one of a positive type photosensitive organic material and a negative type photosensitive organic material. The photosensitive organic material may include a sensitizer and various additives. The sensitizer can include at least one of a polymer binder, PAC (photoactive compound), PAG (photo acid generator) and PI (polyimide). In addition, the photosensitive organic material may further include one of red, green and blue color pigments. For instance, the photosensitive organic material may further include a red color pigment.

After the photosensitive organic material has been coated on the base substrate 110, the photosensitive organic material is subject to an exposure process by irradiating light onto a specific portion of the photosensitive organic material using a mask (not shown). At this time, the positive photosensitive organic material may not be exposed to the light at one of the sub-pixel areas, for instance, at a red sub-pixel area.

After the exposure process has been performed, the exposed photosensitive organic material is developed to pattern the photosensitive organic material including one of red, green and blue color pigments. In the development process, the developing rate for the photosensitive organic material in the exposed region may be different from the developing rate for the photosensitive organic material in the non-exposed region. In detail, the developing rate for the photosensitive organic material in the exposed region is higher than the developing rate for the photosensitive organic material in the non-exposed region. Thus, edge portions of the photosensitive organic material may be tapered after the development process has been completed.

Then, the patterned photosensitive organic material is cured, thereby forming the photosensitive organic material pattern, for instance, the red color filter pattern 120R.

After the red color filter pattern 120R has been formed, the coating, exposure, development and curing processes are repeated for each of the remaining colors, thereby forming the green color filter pattern 120G in the green sub-pixel area and the blue color filter pattern 120B in the blue sub-pixel area.

Referring to FIG. 7, after the red color filter pattern 120R, the green color filter pattern 120G and the blue color filter pattern 120B have been formed, a non-photosensitive organic material is coated on the entire surface of the base substrate 110, thereby forming a non-photosensitive organic material layer 130A. The non-photosensitive organic material may include a binder, a plasticizer and additives. The non-photosensitive organic material may further include a black color pigment.

The binder may include one selected from the group consisting of unsaturated carboxylic acid, unsaturated carboxylic anhydride, an unsaturated compound containing an epoxy group, acryl-based copolymer, and any mixtures or combinations thereof. In addition, the acryl-based copolymer can be prepared in known manner by performing copolymerization using olefin-based unsaturated compound as monomers, and then removing non-reactive monomers.

The plasticizer may include one of a phthalate-based plasticizer such as dioctyl phthalate or diisononyl phthalate, an adipate-based plasticizer such as dioctyl adipate, a phosphate-based plasticizer such as tricresyl phosphate, and a monoisobutyrate-based plasticizer such as 2,2,4-trimethyl-1,3-pentanedione monoisobutyrate.

In addition, the additives may include an epoxy resin, an adhesive, and a surfactant. The epoxy resin may include one of a bisphenol A type epoxy resin, a phenol novolac type epoxy resin, a cresol novolac type epoxy resin, a cycloaliphatic epoxy resin, a glycidyl ether type epoxy resin, and a glycidyl amine type epoxy resin. In particular, the epoxy resin may include one of bisphenol A type epoxy resin, a cresol novolac type epoxy resin and a glycidyl ether type epoxy resin.

The adhesive may include a silane coupling agent having a reactive substituent such as a carboxyl group, a methacryl group, an isocyanate group, or an epoxy group. In detail, the adhesive may include γ-methacryloxypropyltrimethoxysilane, vinyltriacetoxysilane, vinyltrimethoxysilane, γ-isocyanatepropyltriethoxysilane, γ-glycidoxytrimethoxysilane, or β-(3,4-epoxy cyclo hexyl) ethyltrimethoxysilane.

The surfactant may include polyoxyethyleneoxytylphenylether or polyoxyethylenenonylphenylether.

Referring to FIG. 8, after the non-photosensitive organic material layer 130A has been formed, the non-photosensitive organic material layer 130A is developed and cured, thereby forming a non-photosensitive organic material pattern, for instance, the light blocking layer pattern 130.

In detail, the non-photosensitive organic material layer 130A is developed without exposing the non-photosensitive organic material layer 130A. Since the non-photosensitive organic material layer 130A has no sensitizer, the non-photosensitive organic material layer 130A is not subjected to an exposure process.

As the non-photosensitive organic material layer 130A is developed, it is gradually removed, so the thickness of the non-photosensitive organic material layer 130A is gradually reduced. At this time, the non-photosensitive organic material layer 130A is patterned while adjusting the developing time for the non-photosensitive organic material layer 130A in such a manner that some of the non-photosensitive organic material layer 130A may remain on the photosensitive organic material patterns, that is, on the red color filter pattern 120R, the green color filter pattern 120G and the blue color filter pattern 120B.

Since the edge portions of the color filter patterns 120, which are the photosensitive organic material patterns, have a tapered shape or profile (i.e. angled edges or sides), the edge portions of the non-photosensitive organic material layer 130A may have a reverse-tapered shape after the patterning process. In addition, the thickness of the non-photosensitive organic material layer 130A may be generally equal to or smaller than the thickness of the photosensitive organic material pattern after the patterning process.

After the development process has been finished, the non-photosensitive organic material layer 130A is cured.

Although it has been described that the light blocking layer pattern 130 is used as the non-photosensitive organic material pattern, the present invention is not limited thereto. For instance, one of the red color filter pattern 120R, the green color filter pattern 120G and the blue color filter pattern 120B may be used as the non-photosensitive organic material pattern.

As described above, according to the above-described method of manufacturing a display substrate, the thickness of the non-photosensitive organic material pattern can be adjusted to be substantially equal to the thickness of the photosensitive organic material pattern, by adjusting the developing time of the non-photosensitive organic material. Thus, the upper surface of the display substrate, formed by the upper surfaces of the photosensitive organic material pattern and the non-photosensitive organic material pattern, is made flatter or more planar. Since the display substrate has a flatter surface, an additional overcoat or planarization layer is not needed, and can be omitted.

In addition, according to the above method, an exposure process can be omitted when forming the non-photosensitive organic material pattern, that is, the light blocking layer pattern 130. Therefore, the manufacturing process for the display substrate can be simplified and manufacturing time can be reduced. As a result, the cost of manufacturing the display substrate can be reduced.

The above-described method can also include the addition of color pigment to the non-photosensitive organic material, because the non-photosensitive organic material pattern can be formed without performing an exposure process. In particular, if the non-photosensitive organic material pattern is used as the light-blocking pattern, the contrast of the display panel and the display apparatus having the display substrate can be improved.

Hereinafter, other embodiments of the present invention will be described with reference to FIGS. 9 and 10. In the following description, the same reference numerals will be assigned to the element and structures previously described with reference to FIGS. 1 to 8, and thus detailed description thereof will be omitted.

Figure 9:
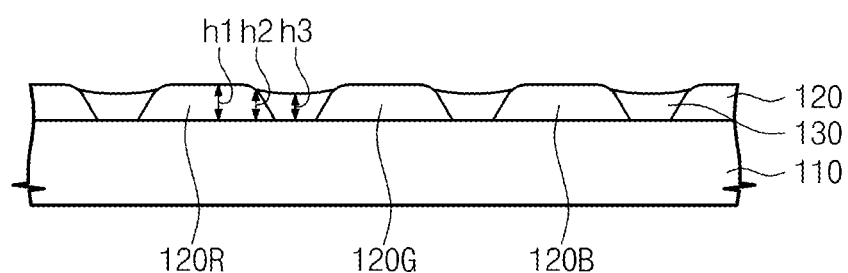
FIG. 9 is a sectional view showing a display substrate used in a display panel according to another embodiment of the present invention.

FIG. 9 is a sectional view showing a display substrate used in a display panel according to a further embodiment of the present invention.

Referring to FIG. 9, a plurality of color filter patterns 120 and the light blocking layer pattern 130 are formed on the base substrate 110.

The color filter patterns 120 may include at least the red color filter pattern 120R, the green color filter pattern 120G, and the blue color filter pattern 120B, which correspond to the various sub-pixel areas in on-to-one correspondence. In addition, the color filter patterns 120 may have tapered edge portions.

Each light blocking layer pattern 130 is disposed between two adjacent color filter patterns 120, and the edge portion of each light blocking layer pattern 130 overlaps with the edge portions of the adjacent color filter patterns 120.

As measured from the surface of the base substrate 110 where the color filter patterns 120 and the light blocking layer pattern 130 are formed, the height h1 of the color filter patterns 120 may be substantially equal to or higher than the height of the light blocking layer pattern 130. That is, the color filter patterns 120 may be the same height as, or taller than, the light blocking layer patterns 130.

In addition, the height h2 of the upper surface of each light blocking layer pattern 130 where it contacts the corresponding color filter pattern 120 may be higher than the height of other regions of the upper surface of light blocking layer pattern 130. In particular, the light blocking layer pattern 130 may have the lowest height h3 at the center between two adjacent color filter patterns 120. That is, as viewed from the perspective of FIG. 9, the light blocking layer patterns 130 have concave upper surfaces whose heights are greater at their outer edges.

The height difference of the light blocking layer pattern 130 may occur when the light blocking layer pattern 130 is developed by using a developer with an isotropic etching property. That is, due to characteristics of isotropic etching, the height h2 of the light blocking layer pattern 130 at edge portions of the color filter patterns 120 may be substantially equal to or higher than the height of other regions of the light blocking layer pattern 130.

Figure 10:
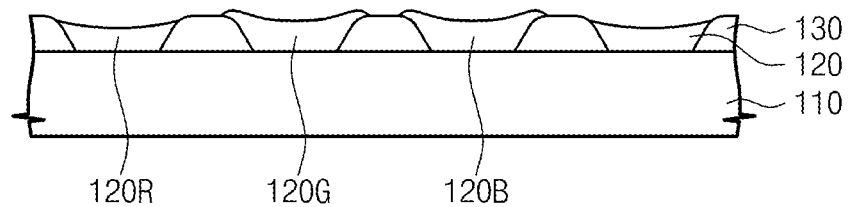
FIG. 10 is a sectional view showing a display substrate used in a display panel according to still another embodiment of the present invention.

FIG. 10 is a sectional view showing a display substrate used in a display panel according to still another embodiment of the present invention.

Referring to FIG. 10, the green color filter pattern 120G and the blue color filter pattern 120B are disposed on the sub-pixel areas of the base substrate 110, and the light blocking layer pattern 130 is formed on the base substrate 110 to generally define the sub-pixel areas. The green color filter pattern 120G, the blue color filter pattern 120B and the light blocking layer pattern 130 can be formed by performing a photolithography process using photosensitive organic material, as described previously. In particular, the light blocking layer pattern 130 is primarily formed to define the sub-pixel areas, and has tapered edge portions.

The red color filter pattern 120R contains non-photosensitive organic material, and is disposed on those remaining sub-pixel areas not already occupied by green or blue patterns 120G, 120B.

Since the red color filter pattern 120R is formed by using non-photosensitive organic material, the edge portion of the red color filter pattern 120R may be reverse-tapered, as it conforms to the shape of the adjacent light blocking layer patterns 130.

In addition, the thickness of the red color filter pattern 120R is generally equal to or smaller than the thickness of the light blocking layer pattern 130.

According to the present embodiment, the red color filter pattern 120R has reverse-tapered edge portions disposed between two tapered patterns, but the present invention is not limited thereto. One of the green color filter pattern 120G and the blue color filter pattern 120B may have the reverse-tapered edge portion disposed between two tapered patterns. Indeed, the invention contemplates that any color, or any pattern of color filters, can be formed with such reverse-tapered edges.

Therefore, the display panel having the display substrate according to the present invention can improve its color reproduction properties.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A display substrate comprising:
a plurality of pixel areas, each pixel area comprising a plurality of sub-pixel areas;
a light blocking layer pattern disposed between adjacent sub-pixel areas; and
a plurality of color filter patterns corresponding to the sub-pixel areas,
wherein each of the color filter patterns has a tapered edge portion and the light blocking layer pattern has a reverse-tapered edge portion,
wherein the tapered and reverse-tapered edge portions overlap such that the reverse-tapered edge portion of the light blocking layer pattern is disposed directly on the tapered edge portion of adjacent color filter patterns,
wherein the light blocking layer pattern includes an organic material that is non-photosensitive prior to curing,
wherein the color filter patterns comprise an organic material that is photosensitive prior to curing, and
wherein the light blocking layer pattern has a concave upper surface, and a height at an edge of the light blocking layer pattern is greater than a height at a center of the light blocking layer pattern.

2. The display substrate of claim 1, wherein the light blocking layer pattern has a thickness generally equal to or less than a thickness of the adjacent color filter patterns.

3. The display substrate of claim 1, wherein the light blocking layer pattern has a lowest height at a center of the light blocking layer pattern.

* * * * *